United States Patent Office 2,981,734
Patented Apr. 25, 1961

2,981,734
PERFLUOROALKYL TRIAZINES

Rudi F. W. Rätz and Ehrenfried H. Kober, Hamden, Conn., assignors to Olin Mathieson Chemical Corporation, a corporation of Virginia No Drawing. Filed May 20, 1960, Ser. No. 30,458

2 Claims. (Cl. 260—248)

This invention relates to a novel process for the preparation of 2,4,6-tris-perfluoroalkyl-1,3,5-triazines of the general formula:

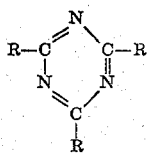

wherein R is a perfluoroalkyl radical. Perfluoroalkyl radicals containing up to 5 carbon atoms are included within the scope of this invention and include, for example, trifluoromethyl, pentafluoroethyl, heptafluoropropyl, nonafluorobutyl, etc.

It has been found that trichlorophosphazo perfluoroacyls can be reacted with argentous fluoride (AgF) at moderate temperatures to give 2,4,6-tris-perfluoroalkyl-1,3,5-triazines in good yields. A particular advantage of this process is that phosphorous oxyfluoride, a low boiling material which is formed simultaneously with the desired triazine, is evolved from the reaction mixture during the heating period. An additional advantage of this reaction is that no liquid by-products are produced thus facilitating recovery of the triazine formed. The reaction proceeds according to the following general equation:

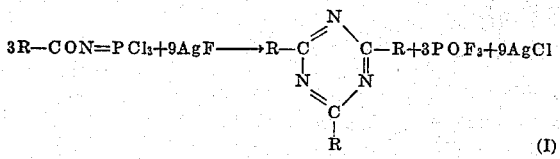

In Equation I above the radical R has the same meaning as previously described. Trichlorophosphazo perfluoroacyls suitable as starting materials for the process of this invention include, for example, trichlorophosphazo trifluoroacetyl, trichlorophosphazo pentafluoropropionyl, trichlorophosphazo heptafluorobutyryl, trichlorophosphazo nonafluorovaleryl, etc. These trichlorophosphazo perfluoroacyls can be conveniently prepared by the known method of heating the corresponding perhaloalkyl acid amide together wth phosphorous pentachloride at a temperature between about 20 and about 140° C.

The reaction of the trichlorophosphazo perfluoroacyl with argentous fluoride (AgF) in accordance with this invention is carried out by admixing the two components and warming up the reaction mixture until the reaction starts which is indicated by the evolution of phosphorus oxyfluoride. Although the process may be carried out with substantial yields of the desired product by reacting the stoichiometric quantity of the trichlorophosphazo perfluoroacyl with the argentous fluoride, an excess of argentous fluoride up to about 3 moles to 1 mole of the acyl compound may be employed with resulting higher yields. The reaction temperature can be varied widely between about 50 and 150° C. with the preferred temperature range being between about 60 and about 100° C. In a like manner the reaction time can be varied between about 1 to about 4 hours. The 2,4,6-trisperfluoroalkyl-1,3,5-triazines formed can be isolated from the reaction mixture by distillation or by crystallization.

The 2,4,6-tris-perhaloalkyl-1,3,5-triazines of this invention are useful as intermediates. In addition, fluorinated 1,3,5-triazines exhibit unusual thermal stability and are extremely resistant to oxidative or reductive degradation as described in Grundmann et al. United States Patent 2,845,421 and as shown by Reilly and Brown, J. Org. Chem. 22, 699 (1957). These properties make such compounds valuable as heat transfer media, coolants and moderators.

This invention is further illustrated but not limited by the following example:

EXAMPLE (A) *Trichlorophosphazo-trifluoroacetyl*

Trifluoroacetamide (45.2 g.) was mixed together with 83.4 g. of thoroughly powdered phosphorus pentachloride. Heating at 40° C. started evolution of hydrogen chloride and at 52° C. the mixture had liquefied. The heating was continued at 72° C. for four hours and the reaction product finally fractionated under atmospheric pressure. After a small forerun, the main portion consisting of trichlorophosphazo-trifluoroacetyl distilled at 146–149° C. (750 mm. Hg), 73.2 g. (73.6 percent of the theoretical quantity), $n^{25.5}$D 1.4341.

Calcd. for $C_2ClCFCNPO$: N, 5.64; Cl, 42.83. Found: N, 5.03; Cl, 43.03.

(B) *2,4,6-tris-trifluoromethyl-1,5,3-triazine*

Trichlorophosphazo-trifluoroacetyl (24.85 g.) was heated with argentous fluoride (38.1 g.) at 60° C. for two hours, then a further amount of argentous fluoride (2.0 g.) was added and the reaction mixture was refluxed for one additional hour. During this operation, a considerable amount of very low boiling material condensed in a Dry Ice-acetone cooled trap which was connected to the reaction apparatus through a condenser. This product consisted mainly of phosphorus oxyfluoride. Fractional distillation of the reaction mixture gave 2,4,6-tris-trifluoromethyl-1,3,5-triazine, 4.1 g. (14.5 percent of the theoretical quantity), B.P. 93° C. (750 mm. Hg); $n^{26.5}$D 1.3194. These physical data are identical with those of 2,4,6-tris-trifluoromethyl-1,3,5-triazine prepared by E. T. McBee, Ind. Eng. Chem. 39, 391 (1947); B.P. 96–98° C. (760 mm. Hg); $n^{28}$D 1.3209.

Calcd. for $C_6F_9N_3$: C, 25.2; N, 14.7. Found: C, 24.9; N, 14.53.

What is claimed is:

1. The process of preparing 2,4,6-tris-perfluoroalkyl-1,3,5-triazines of the formula:

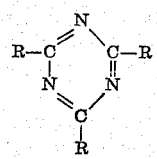

wherein R is a perfluoroalkyl radical, which comprises reacting a trichlorophosphazo perfluoroacyl of the formula:

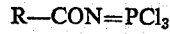

$$R—CON=PCl_3$$

wherein R is a perfluoroalkyl radical containing not more than 5 carbon atoms, with argentous fluoride at temperatures between about 50° C. and about 150° C.

2. The process of preparing 2,4,6-tris-trifluoromethyl-1,3,5-triazine which comprises reacting trichlorophosphazo trifluoroacetyl with argentous fluoride at a temperature between about 50° C. and about 150° C.

References Cited in the file of this patent

Steinholft et al.: Ber. d. Deutsch. Chem. Ges., vol. 41, pages 3586–3587 (1908).

McBee et al.: Industrial and Engineering Chemistry, vol. 39, pages 391 to 392 (1947).

Chemical Abstracts, vol. 51, cols. 1821–1822 (1957).